United States Patent
Jeong et al.

(10) Patent No.: US 7,659,642 B2
(45) Date of Patent: Feb. 9, 2010

(54) STATOR FIXING APPARATUS OF RECIPROCATING COMPRESSOR

(75) Inventors: Sang-Sub Jeong, Siheung (KR);
Won-Sik Oh, Seoul (KR); Hyuk Lee, Siheung (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 11/239,127

(22) Filed: Sep. 30, 2005

(65) Prior Publication Data

US 2006/0152102 A1 Jul. 13, 2006

(30) Foreign Application Priority Data

Jan. 13, 2005 (KR) .................. 10-2005-0003405

(51) Int. Cl.
*H02K 33/00* (2006.01)
*H02K 1/00* (2006.01)
(52) U.S. Cl. .................. 310/15; 310/216; 310/254
(58) Field of Classification Search ................ 310/216, 310/254, 15
See application file for complete search history.

(56) References Cited

U.S. PATENT DOCUMENTS

| | | | | |
|---|---|---|---|---|
| 3,119,940 | A * | 1/1964 | Pettit et al. ................. 310/24 |
| 4,543,502 | A * | 9/1985 | Jarret et al. ................. 310/15 |
| 5,257,915 | A * | 11/1993 | Laskaris et al. ............. 417/418 |
| 5,261,799 | A * | 11/1993 | Laskaris ................. 417/418 |
| 5,318,412 | A | 6/1994 | Laskaris et al. |
| 6,077,054 | A * | 6/2000 | Lee et al. ................. 417/417 |
| 6,268,671 | B1 * | 7/2001 | Furuki ................. 310/81 |
| 2001/0007400 | A1 * | 7/2001 | Griswold ................. 310/14 |
| 2001/0043450 | A1 * | 11/2001 | Seale et al. ................. 361/160 |
| 2002/0105247 | A1 | 8/2002 | Park |
| 2003/0099559 | A1 * | 5/2003 | Oh et al. ................. 417/417 |

(Continued)

FOREIGN PATENT DOCUMENTS

CN 2632922 8/2004

(Continued)

OTHER PUBLICATIONS

Patent Abstract, of Japan vol. 003, No. 096 (E-130), (Aug. 15, 1979).

(Continued)

*Primary Examiner*—Quyen Leung
*Assistant Examiner*—Alex W Mok
(74) *Attorney, Agent, or Firm*—Ked & Associates LLP (57) ABSTRACT

A stator fixing apparatus of a reciprocating compressor comprises a first frame on which a plurality of first core blocks, each comprising a plurality of laminated stator core sheets, are radially coupled, the plurality of first core blocks being coupled to one side surface of a bobbin body, and a second frame on which a plurality of second core blocks, each comprising a plurality of laminated stator core sheets, are radially coupled. The plurality of second core blocks are coupled to the other side surface of the bobbin body. A coupling portion is provided at each contact portion between the first core block and the second core block, for coupling the first and second core blocks. Thus, deformation of an initial shape of the stator or increase of a defect rate due to a molding material can be prevented, and heat and moisture can easily be discharged, so as to improve the efficiency and reliability of the reciprocating compressor.

26 Claims, 6 Drawing Sheets

U.S. PATENT DOCUMENTS

| | | |
|---|---|---|
| 2003/0147759 A1 | 8/2003 | Chang |
| 2003/0173834 A1* | 9/2003 | McGill et al. .................. 310/12 |
| 2004/0025325 A1 | 2/2004 | Kawano et al. |
| 2004/0189103 A1* | 9/2004 | Duncan et al. ................. 310/12 |
| 2004/0208759 A1 | 10/2004 | Hong |
| 2004/0232777 A1* | 11/2004 | Yumita et al. .................. 310/12 |
| 2004/0239192 A1* | 12/2004 | Lilie ............................ 310/12 |
| 2004/0245862 A1* | 12/2004 | Hong et al. .................... 310/12 |
| 2004/0245863 A1* | 12/2004 | Hong et al. .................... 310/14 |
| 2005/0214140 A1 | 9/2005 | Lee et al. |
| 2005/0251993 A1 | 11/2005 | Starke et al. |

FOREIGN PATENT DOCUMENTS

| | | |
|---|---|---|
| CN | 1538067 | 10/2004 |
| GB | 2037093 | 7/1980 |
| JP | 54-075005 | 6/1979 |
| JP | 62-281743 | 12/1987 |
| JP | 64-074038 | 3/1989 |
| WO | 2004/006413 | 1/2004 |
| WO | WO 2004040594 A1 * | 5/2004 |

OTHER PUBLICATIONS

Patent Abstracts of Japan, vol. 012, No. 174 (E-612), May 24, 1988.
Patent Abstracts of Japan, vol. 013, No. 295 (E-783), (Jul. 7, 1989).
English language Abstract of CN 1538067.
English language Abstract of CN 2632922.

* cited by examiner

STATOR FIXING APPARATUS OF RECIPROCATING COMPRESSOR

The present disclosure relates to subject matter contained in priority Korean Application No. 03405/2005, filed on Jan. 13, 2005, the disclosure of which is herein expressly incorporated by reference in its entirety.

BACKGROUND OF THE INVENTION

1. Field of the Invention

The present invention relates to a reciprocating compressor, and particularly, to a stator fixing apparatus of a reciprocating compressor and a fabrication method thereof capable of preventing deformation of an original shape or increase of a defect rate due to a molding material by omitting an overmolding process using the molding material in a stator fabricating process, and of improving efficiency and reliability of the reciprocating compressor by facilitating discharging of heat and moisture.

2. Description of the Conventional Art

In general, compressors convert electrical energy into kinetic energy and compress a refrigerant gas by the kinetic energy. The compressors, as a main component making up a refrigeration cycle system, include various types such as a rotary compressor, a scroll compressor, a reciprocating compressor and the like according to a compression mechanism. The refrigeration cycle system including such compressors are used in refrigerators, air-conditioners, showcase coolers and the like.

The reciprocating compressor among those compressors is a compressor in which a piston linearly reciprocates in a cylinder, and sucks and compresses gas for discharging it, an example of which will be shown as follows.

Figure 1:
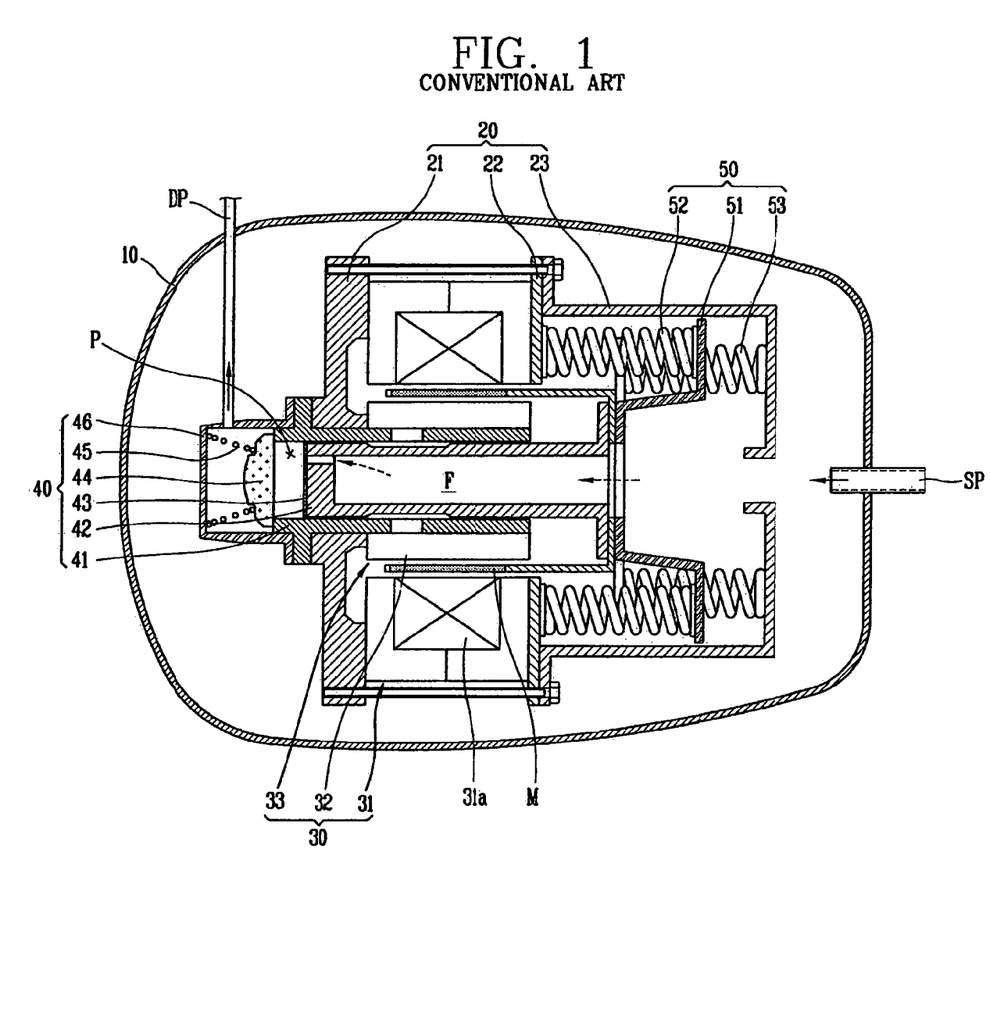
FIG. 1 is a sectional view showing an embodiment of the conventional reciprocating compressor.
Figure 2:
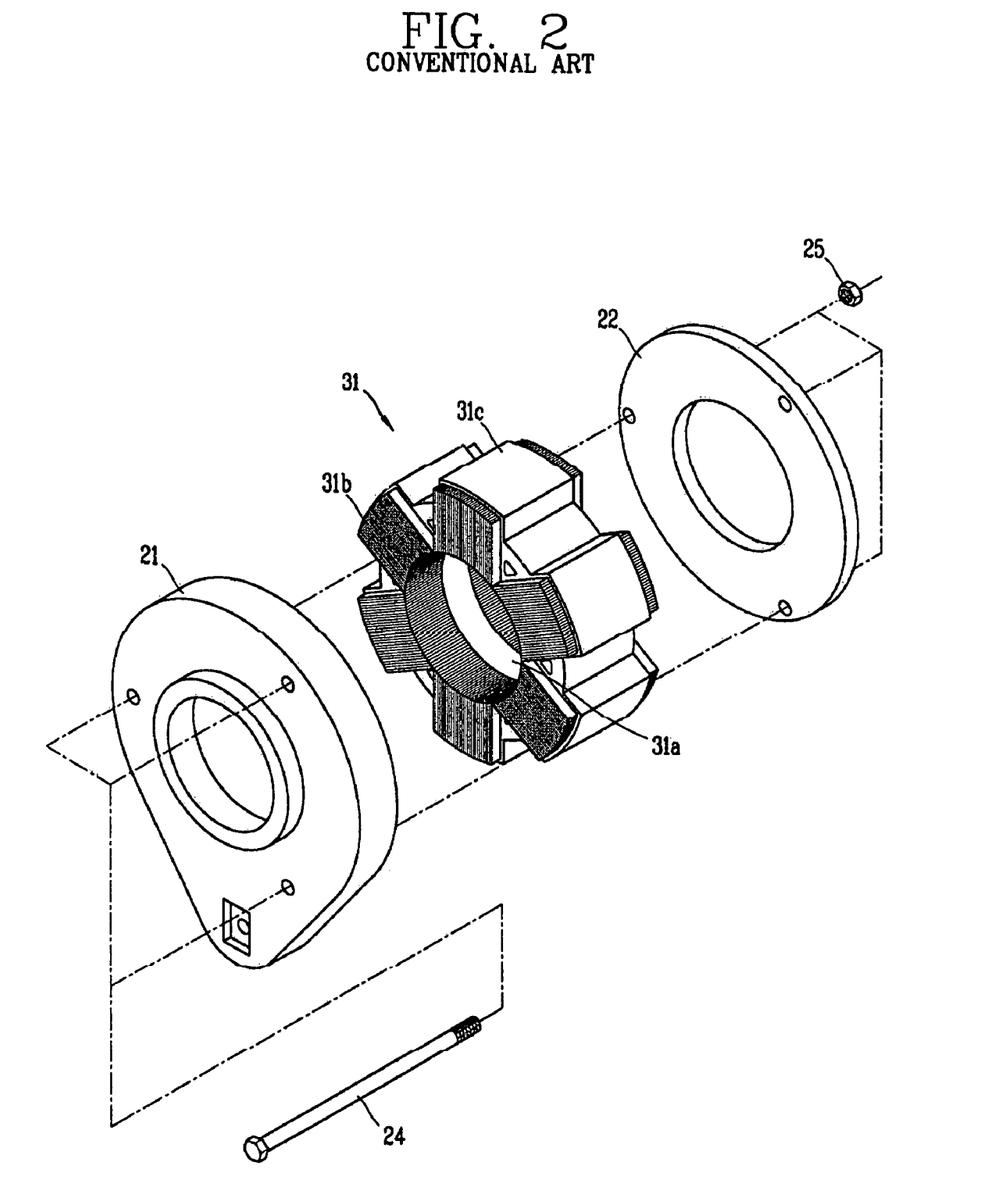
FIG. 2 is a disassembled perspective view showing an outer stator fixing apparatus in the conventional reciprocating compressor.
Figure 3:
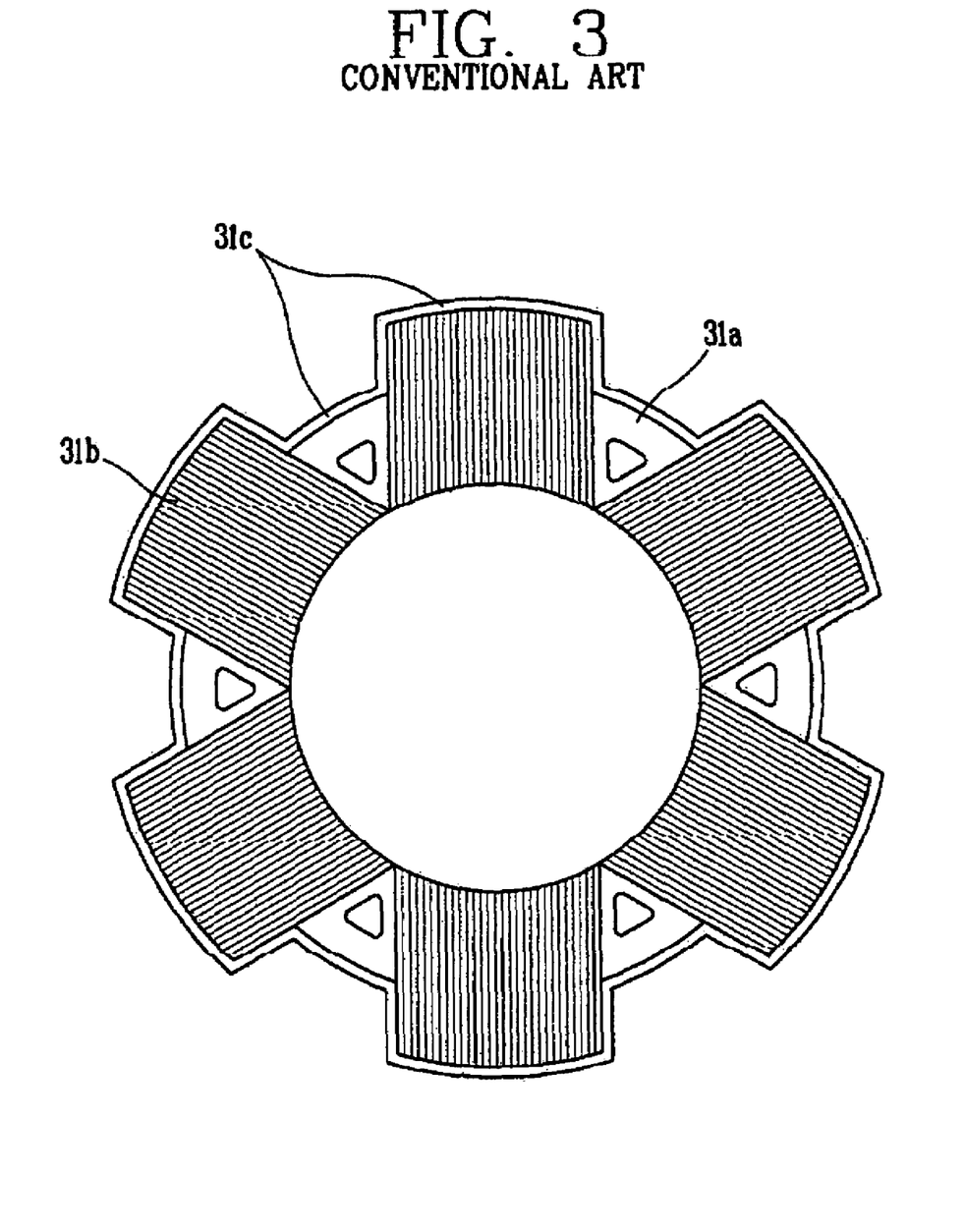
FIG. 3 is a front view showing a fixed state of the outer stator in the conventional reciprocating compressor.

FIG. 1 is a sectional view showing an example of the conventional reciprocating compressor, FIG. 2 is an exploded perspective view showing an outer stator fixing apparatus of the conventional reciprocating compressor, and FIG. 3 is a front sectional view showing a fixed state of the outer stator in the conventional reciprocating compressor.

As shown in those drawings, the conventional reciprocating compressor includes: a frame unit 20 elastically supported in a casing 10; a reciprocating motor 30 supported by the frame unit 20, and having a mover 33 which linearly reciprocates; a compression unit 40 connected to the reciprocating motor 30 and supported by the frame unit 20; and a resonant spring unit 50 for elastically supporting the reciprocating motor 30 and inducing its resonant motion.

The frame unit 20 includes: a front frame 21 for supporting a front side of the reciprocating motor 30, a middle frame 22 coupled to the front frame 21, for supporting a rear side of the reciprocating motor 30; and a rear frame 23 coupled to the middle frame 22, for supporting the resonant spring unit 50.

The reciprocating motor 30 includes: an outer stator 31 having a coil winding and fixed to the front frame 21; an inner stator 32 positioned inside the outer stator 31 spaced therefrom by a certain air gap and fixedly inserted into a cylinder 41; a mover 33 interposed in the air gap between the outer stator 31 and the inner stator 32, for linearly reciprocating.

The outer stator 31 includes a bobbin body 31a in which the coil bonding is inserted; several core blocks 31b are formed by laminating a plurality of stator core sheets in a circular arc shape, and inserted in both sides of the bobbin body 31a to be coupled thereto; a molding body 31c fixed to the bobbin body 31a by molding a connected portion of each core block 31b.

The molding body 31c is formed of an insulator such as epoxy so as to consecutively fix an outer circumferential surface of the bobbin body 31a and the connected portion of each core block 31b.

The compression unit 40 includes: a cylinder 41 fixed to the front frame 21; a piston 42 slidably inserted in the cylinder 41 and coupled to the mover 33 of the reciprocating motor 30, for reciprocating in upper and lower directions; a suction valve 43 mounted on a front end surface of the piston 42, for opening/closing a suction path F; a discharge valve 44 mounted in an outlet of the cylinder 41, for restricting the discharge of a compressed gas; a valve spring 45 for elastically supporting the discharge valve 44; a discharge cover 46 having the discharge valve 44 and the valve spring 45 therein and covering the outlet of the cylinder 41.

The resonant spring unit 50 includes: a spring support 51 coupled to a portion connected between the mover 33 and the piston 42; and a first resonant spring 52 and a second resonant spring 53 provided at upper and lower sides of the spring support 51 and formed of a compressed coil spring to elastically support the piston 42.

Among previously unexplained reference symbols, M denotes a magnet, P denotes a compression space, SP denotes a suction pipe, and DP denotes a discharge pipe.

An operation of such conventional reciprocating compressor and a structure thereof will now be explained.

When power is applied to the outer stator 31 of the reciprocating motor 30, a flux is formed between the outer stator 31 and the inner stator 32, and thus the mover 33 and the piston 42 move along the direction of the flux. A this time, the mover 33 linearly reciprocates by the resonant spring unit 50 and the piston 42 also linearly reciprocates in the cylinder 41, whereby a pressure difference occurs in the compression space P of the cylinder 41. As a result, a series of processes, namely, sucking a refrigerant gas, compressing the refrigerant gas until it has a certain pressure, and discharging it, are repeatedly performed.

Here, in order to assemble the reciprocating compressor, as shown in FIG. 2, the core block 31b is formed by perforating a plurality of stator core sheets as a thin plate and laminating them. Afterwards, this core block 31b is inserted in an outer side surface of the bobbin body 31a having the coil winding in a particular mold, and then the molding body 31c is formed by performing an overmolding between a connected portion, between the outer circumferential surface of the bobbin body 31a and the core block 31b, and a space, between the outer circumferential surface of the bobbin body 31a and an inner circumferential surface of the core block 31b, thereby resulting in forming the outer stator 31. Thereafter, the outer stator 31 is separated from the mold. The outer stator 31 positions between the front frame 21 and the middle frame 22 together with the inner stator 32 and then is fixedly coupled to the frame unit 20 by using a coupling bolt 24 and a coupling nut 25.

However, in the conventional reciprocating compressor, a molding pressure generated when a molding material is injected during the process for fabricating the outer stator 31 of the reciprocating motor 30 or a contracting force generated when the molding material is hardened pressurize the core block 31b, which may cause deformation of parts of the core block 31b. As a result, a distance between cores positioned between the outer stator 31 and the inner stator 32 is narrower, and accordingly an appropriate air gap between the outer stator 31 and the inner stator 32 is not maintained, thereby causing degradation of efficiency and reliability of the compressor.

Moreover, at the time of an initial injection of the outer stator 31, an initial loss may occur when conditions of temperature and pressure for the molding material are established, and a defect rate may be increased due to the ununiformity of the product according to the injection molding temperature.

In addition, in case of the overmolding structure at the time of assembling the outer stator 31 by injection, as shown in FIG. 3, the outer stator 31 is formed in a hemi-sealed shape, which may make it difficult to discharge heat and moisture from the coil winding and thus lower a motor efficiency.

SUMMARY OF THE INVENTION

Therefore, an object of the present invention is to provide a stator fixing apparatus of a reciprocating compressor and fabrication method thereof capable of preventing deformation of an initial shape or increase of a defect rate due to a molding material by omitting an overmolding process using the molding material in a fabrication method for a stator, and of improving efficiency and reliability of the reciprocating compressor by facilitating discharging of heat and moisture.

To achieve these and other advantages and in accordance with the purpose of the present invention, as embodied and broadly described herein, there is provided a stator fixing apparatus of a reciprocating compressor comprising: a first frame on which a plurality of first core blocks formed by laminating a plurality of stator core sheets are radially coupled, the plurality of first core blocks being coupled to one side surface of a bobbin body; a second frame on which a plurality of second core blocks formed by laminating a plurality of stator core sheets are radially coupled, the plurality of second core blocks being coupled to the other side surface of the bobbin body; and a coupling portion formed at each contact portion between the first core block and the second core block, for coupling the first and second core blocks.

According to another embodiment of the present invention, a stator fixing apparatus of a reciprocating compressor comprises: a first frame on which a plurality of first core blocks formed by laminating a plurality of stator core sheets are radially coupled, the plurality of first core blocks being coupled to one side surface of a bobbin body; a second frame on which a plurality of second core blocks formed by laminating a plurality of stator core sheets are radially coupled, the plurality of second core blocks being coupled to the other side of the bobbin body; and a coupling member for coupling the first frame and the second frame so that the first and second core blocks are contact with each other to thusly be adhered closely to both sides of the bobbin body.

To achieve these and other advantages and in accordance with the purpose of the present invention, as embodied and broadly described herein, there is provided a fabrication method for a stator fixing apparatus of a reciprocating compressor comprising the steps of: fabricating first core blocks and second core blocks by winding a coil on a bobbin body, perforating a plurality of stator core sheets in an appropriate shape, and thereafter laminating the perforated stator core sheets; radially positioning the first core blocks and the second core blocks on facing surfaces of a first frame and a second frame, respectively, whereby the arranged first and second core blocks respectively form a circular inner circumferential surface and an outer circumferential surface at which the first and second core blocks are arranged with a certain interval; fixedly-coupling each core block to each frame; and contacting the first core blocks and the second core blocks with each other to be adhered closely to both sides of the bobbin body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The above and other objects, features and advantages of the present invention will be made apparent from the following description of the preferred embodiments, given as non-limiting examples, with reference to the accompanying drawings.

Figure 4:
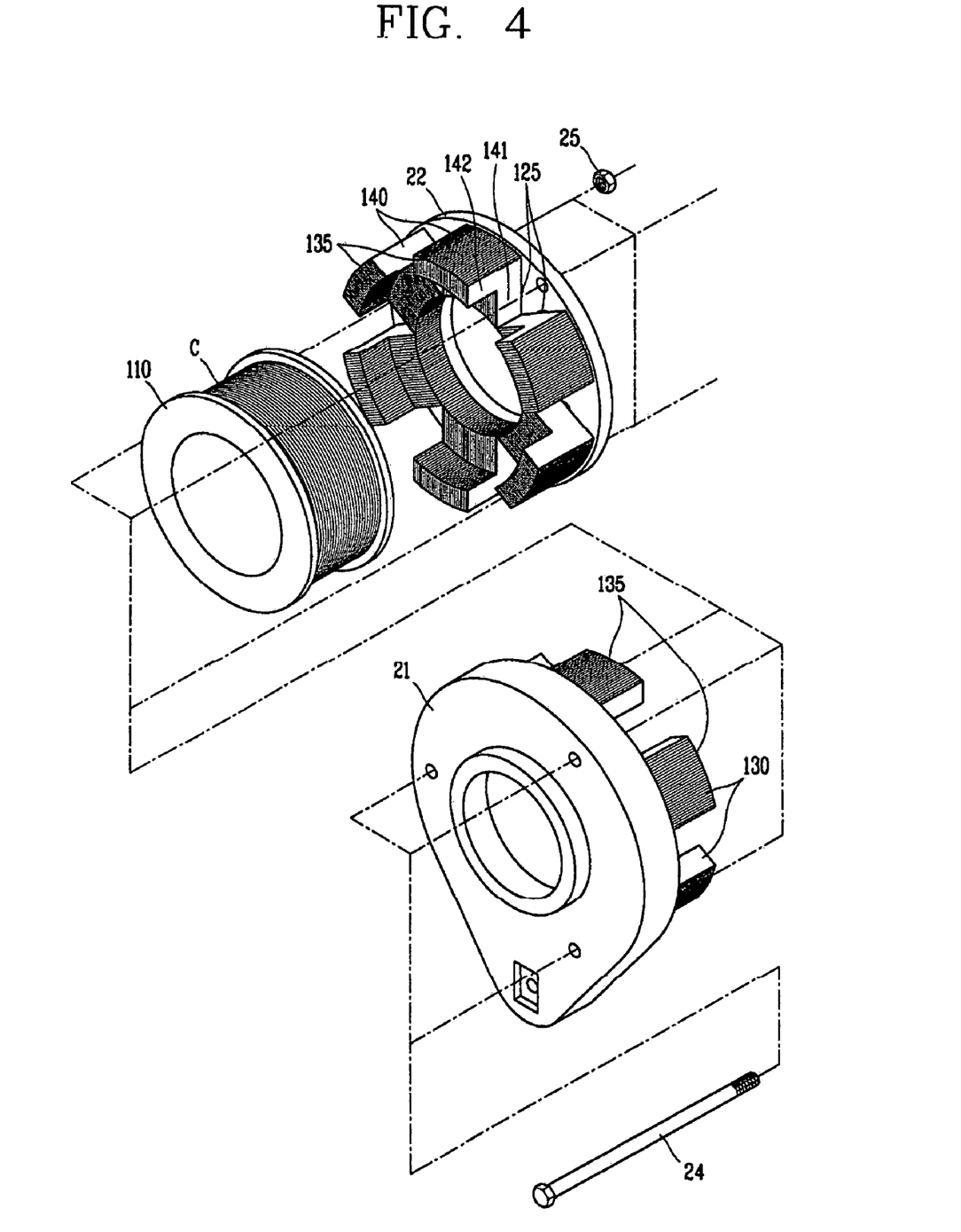
FIG. 4 is a disassembled perspective view showing an outer stator fixing apparatus in a reciprocating compressor according to the present invention.
Figure 5:
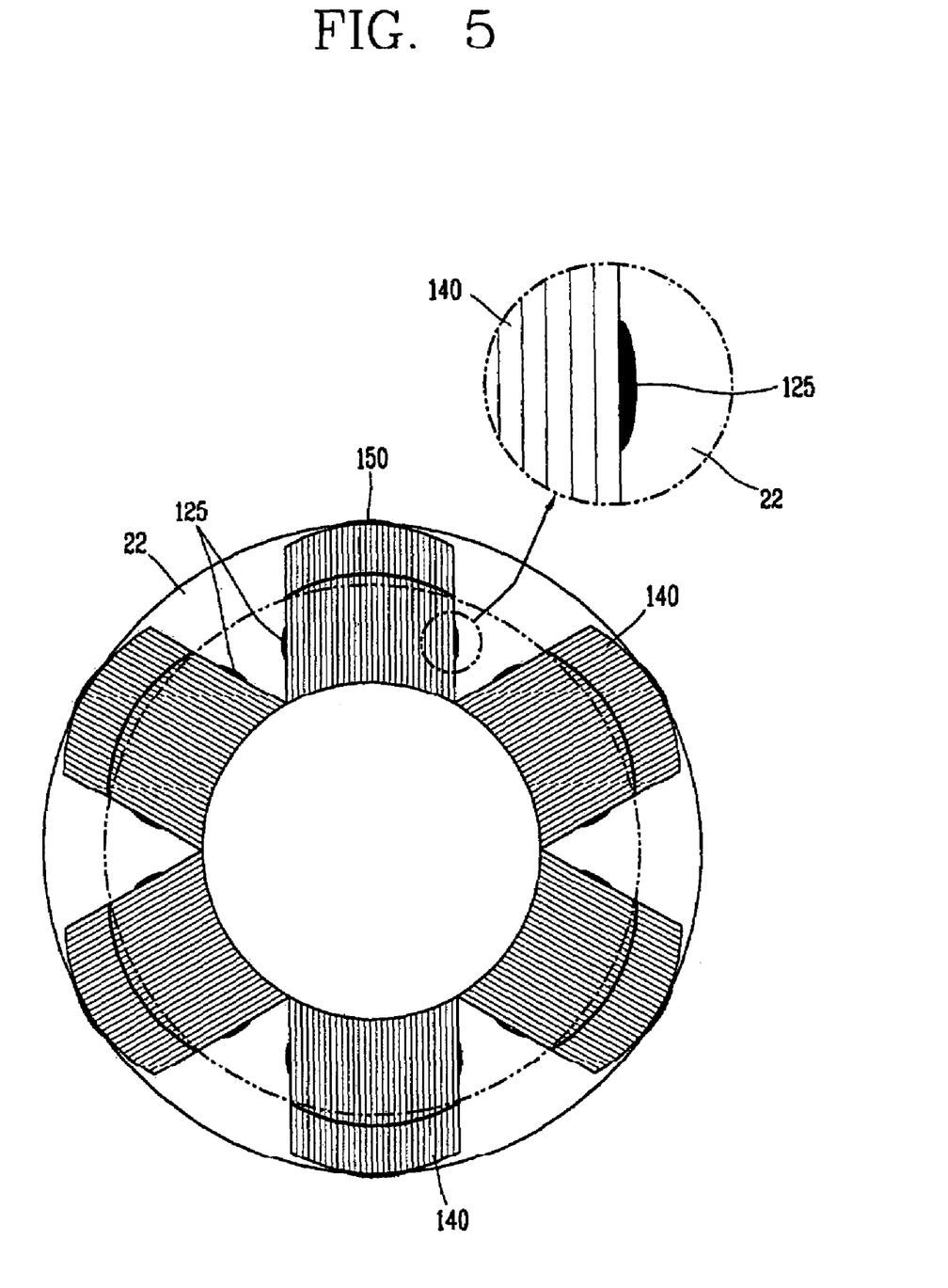
FIG. 5 is a front view showing a fixed state of the outer stator in the reciprocating compressor according to the present invention.
Figure 6:
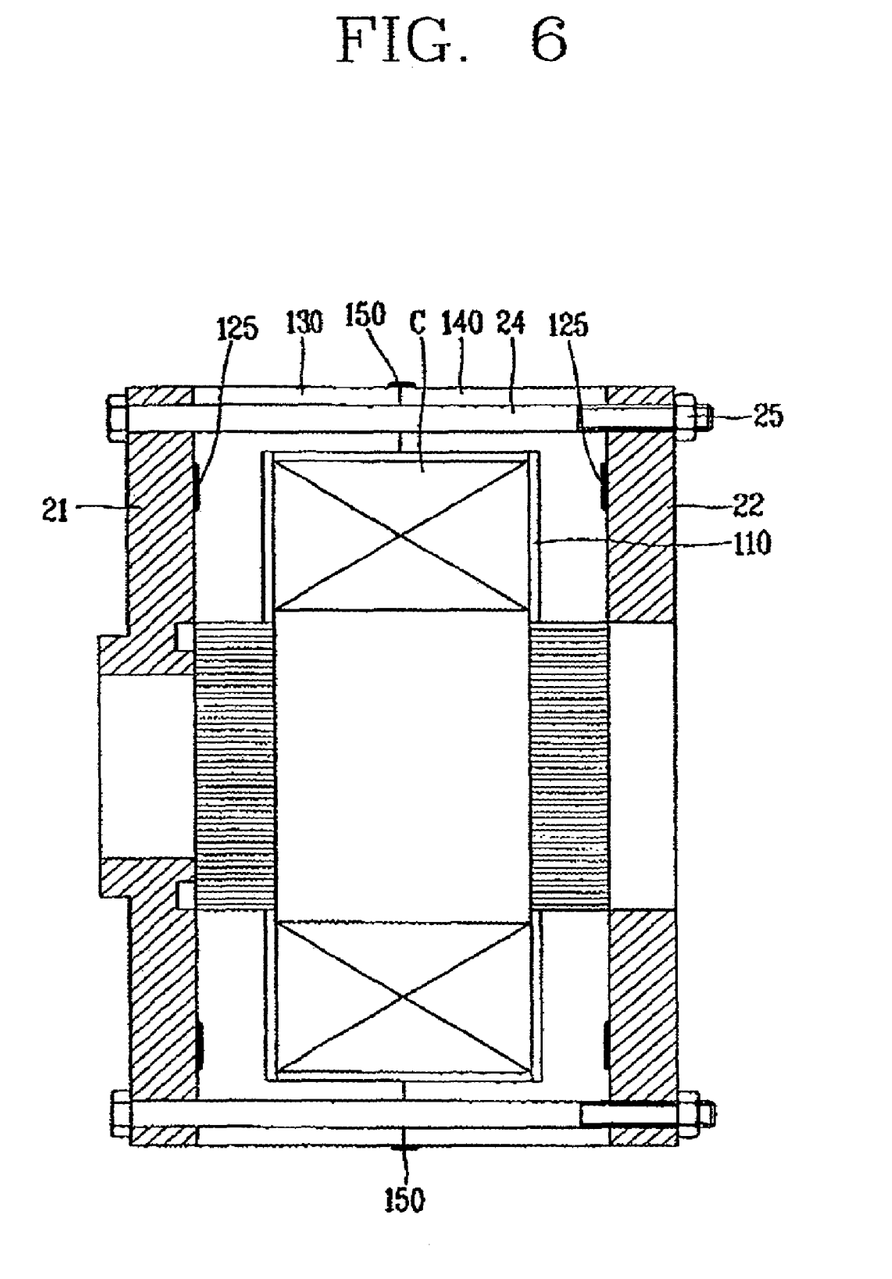
FIG. 6 is a lateral sectional view showing a fixed state of the outer stator in the reciprocating compressor according to the present invention.

FIG. 4 is a disassembled perspective view showing a fixing apparatus for an outer stator in a reciprocating compressor according to the present invention, FIG. 5 is a front view showing a fixed state of the outer stator in the reciprocating compressor according to the present invention, and FIG. 6 is a lateral sectional view showing a fixed state of the outer stator in the reciprocating compressor according to the present invention.

As shown in those drawings, the stator fixing apparatus of the reciprocating compressor includes: a front frame 21 on which a plurality of first core blocks 130 formed by laminating a plurality of stator core sheets are radially coupled, the plurality of first core blocks 130 being coupled to one side surface of a bobbin body 110; a middle frame 22 on which a plurality of second core blocks 140 formed by laminating a plurality of stator core sheets are radially coupled, the plurality of second core blocks 140 being coupled to the other side surface of the bobbin body 110; and a coupling portion formed at each contact portion between the first core block 130 and the second core block 140, for coupling the first and second core blocks 130 and 140.

The bobbin body 110 with a cylindrical shape has a space of which one side is open, and a coil C is wound on an outer circumferential surface of the bobbin body 110. The bobbin body 110 is formed by a molding using resin such as plastic so as to act as an insulator.

Each core block 130 and 140 includes a horizontal portion (not shown and 141) horizontally coupled to an inner side surface of each frame 21 and 22, and a vertical portion (not shown and 142) integrally formed with the horizontal portion (not shown and 141) and vertically extending inwardly to the inside of each frame 21 and 22.

Preferably, a welded portion 125 for fixedly coupling the middle frame 22 and the second core blocks 140 is provided at an interface between the second core blocks 140 and the middle frame 22. Each welded portion 125 is preferably formed and fixed near the middle part of the horizontal portion 141 of the second core block 140 by welding. The welded portion 125 may also be formed on an outer side surface where the horizontal portion 141 meets the vertical portion 142 to be contact with the middle frame 22, namely, a position where an outer circumferential surface of the second core block 140 is contact with the middle frame 22. Otherwise, the welded portion 125 may not be formed anywhere, but rather the middle frame 22 and the second core blocks 140 may be bonded on the contact surface between the horizontal portion 141 and the middle frame 22 by using an adhesive. The front frame 21 and the first core blocks 130 may also be coupled to each other according to the same ways as aforementioned.

The coupling portion 150 for coupling the first core block 130 and the second core block 140 is preferably formed at the most outer side surface of the contact portion 135 between the first core block 130 and the second core block 140 in a radius direction.

The coupling portion 150 can be formed by welding, and also be formed by being bonded with the adhesive.

Here, when the two core blocks 130 and 140 are welded or bonded, a coupling force therebetween may be weak, so that the two core blocks 130 and 140 may preferably be coupled to each other more firmly by tightening each frame 21 and 22 using the bolt 24 and the nut 25.

On the other hand, the coupling portion 150 may not be formed between two core blocks by such welding, but each frame 21 and 22 may be coupled only using the coupling member such as the bolt and nut. That is, the coupling member adheres the first core block 130 and the second core block 140 closely to both sides of the bobbin body 110 by contacting the first and second core blocks 130 and 140 with each other.

The coupling member is not limited on the bolt and nut, but may include the adhesive or other rivets or any other type of connecting device or any combination thereof.

A fabrication method for the stator fixing apparatus of the reciprocating compressor according to the present invention will now be explained.

First, the coil C is wound on the bobbin body 110. A plurality of stator core sheets are perforated or stamped out in an appropriate shape and laminated so as to fabricate the first core block 130 and the second core block 140.

Next, the first core block 130 and the second core block 140 are radially positioned on facing surfaces of each of the front frame 21 and the middle frame 22. Thus, the first and second core blocks 130 and 140 form a circular inner circumferential surface and an outer circumferential surface at which first and second core blocks 130 and 140 are arranged with a certain interval.

Next, the welded portion 125 is formed at a part of an interface between each core block 130 and 140 and each frame 21 and 22, so as to couple each core block 130 and 140 and each frame 21 and 22 by welding.

Next, when the first core block 130 and the second core block 140 are coupled to both side surfaces of the bobbin body 110 so as to be in contact with each other, one side of the contact portion between the two core blocks 130 and 140 is welded to thusly form the coupling portion 150. At this time, preferably, the two core blocks 130 and 140 are firmly coupled to each other by tightening the front frame 21 and the middle frame 22 using the bolt 24 and the nut 25. Conversely, after each frame 21 and 22 is first fixed by the coupling member, the coupling portion 150 of each core block 130 and 140 may be welded. In the alternative, each frame 21 and 22 is fixed only using the coupling member and each core block 130 and 140 may not individually be coupled to each other by such welding.

Hereinafter, an effect of the present invention will now be described.

By omitting the process for performing the overmolding by injecting the molding material in the process for fabricating the stator, the deformation of the stator caused by the injection pressure of the molding material generated at the time of injecting the molding material can be prevented. In addition, by decreasing the deformation of the stator caused by the injection pressure, the gap between the outer and inner stators is uniformly maintained, which can improve stability and reliability of the reciprocating compressor.

Furthermore, the assembling process for the stator can simplified, by welding the core blocks for coupling thereto, which leads to reduction of fabrication cost and improvement of productivity.

In addition, the open side of the bobbin body is not sealed by the molding material. As a result, heat generated from the coil can easily be discharged, and the inside of the bobbin body can be protected from moisture, thereby improving efficiency and reliability of the reciprocating compressor.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention I more detail than is necessary for the fundamental understanding of the present invention, the description is taken with the drawings making apparent to those skilled in the art how the forms of the present invention may be embodied in practice.

What is claimed is:

1. A stator fixing apparatus of a reciprocating compressor comprising:

a first frame on which a plurality of first core blocks, each comprising a plurality of laminated stator core sheets, are radially coupled, the plurality of first core blocks being welded to the first frame and coupled to one side surface of a bobbin body;

a second frame on which a plurality of second core blocks, each comprising a plurality of laminated stator core sheets, are radially coupled, the plurality of second core blocks being welded to the second frame and coupled to another side surface of the bobbin body, and at least one coupling member to couple the first frame to the second frame so that the first and second core blocks contact each other and contact said side surface and said another side surface of the bobbin body respectively, wherein the plurality of first core blocks are welded to the plurality of second core blocks, a coil is wound around the bobbin body, and the plurality of first core blocks and the plurality of second core blocks are arranged on the first and second frames so as to expose portions of the coil, thereby allowing heat generated by the coil to be discharged and protecting an inside of the bobbin body from moisture.

2. The apparatus of claim 1, wherein each core block comprises:
a first portion coupled to an inner side surface of each frame that extends along the respective inner side surface of the frame; and
a second portion integral with the first portion that extends perpendicular to the respective inner side surface of the frame.

3. The apparatus of claim 2, wherein each core block is shaped as an 'L'.

4. The apparatus of claim 1, wherein each frame and each core block are coupled by a weld at an interface therebetween.

5. The apparatus of claim 1, further comprising:
a coupling portion to couple the first core block and the second core block at a contact point between the first core block and the second core block.

6. The apparatus of claim 5, wherein the coupling portion comprises a weld at outer side surfaces of the contact between the first core block and the second core block.

7. The apparatus of claim 1, wherein the bobbin body is formed in a cylindrical shape, and has a space of which one side is open so as to wind the coil on an outer circumferential surface of the bobbin body.

8. The apparatus of claim 1, wherein the coupling member includes a bolt that extends between the first frame and the second frame.

9. The apparatus of claim 8, wherein the bolt passes completely through the first frame and the second frame, and wherein a first end of the bolt is located along a side surface of the first frame and a second end of the bolt is coupled at a side surface of the second frame.

10. The apparatus of claim 9, wherein the second end of the bolt is coupled to a nut or other fastening member at the side surface of the second frame.

11. The apparatus of claim 9, wherein the first frame and second frame include aligned first and second holes, the first hole located between respective pairs of adjacent first core blocks and the second hole located between adjacent second core blocks.

12. The apparatus of claim 1, wherein a first coupling member couples the first frame to the second frame at a location between a first pair of adjacent first core blocks fixed to the first frame and a location between a first pair of adjacent second core blocks fixed to the second frame.

13. The apparatus of claim 12, further comprising:
at least a second coupling member to couple the first frame to the second frame,
wherein the second coupling member couples the first frame to the second frame at a location between a second pair of adjacent first core blocks fixed to the first frame and a location between a second pair of adjacent core blocks fixed to the second frame, and wherein the second coupling member is spaced from the first coupling member at a predetermined angle relative to a central axis of the coil.

14. A stator fixing apparatus of a reciprocating compressor comprising:
a first frame on which a plurality of first core blocks, each comprising a plurality of laminated stator core sheets, are radially coupled, the plurality of first core blocks being coupled to the first frame with an adhesive and coupled to one side surface of a bobbin body;
a second frame on which a plurality of second core blocks, each comprising a plurality of laminated stator core sheets, are radially coupled, the plurality of second core blocks being coupled to the second frame with an adhesive and coupled to another side surface of the bobbin body, and
a coupling member to couple the first frame to the second frame so that the first and second core blocks contact each other and contact said side surface and said another side surface of the bobbin body, wherein the plurality of first core blocks are coupled to the plurality of second core blocks with an adhesive, a coil is wound around the bobbin body, and the plurality of first core blocks and the plurality of second core blocks are arranged on the first and second frames so as to expose portions of the coil, thereby allowing heat generated by the coil to be discharged and protecting an inside of the bobbin body from moisture.

15. The apparatus of claim 14, wherein each core block comprises:
a first portion coupled to an inner side surface of each frame that extends along the respective inner side surface of the frame; and
a second portion integral with the first portion that extends perpendicular to the respective inner side surface of the frame.

16. The apparatus of claim 15, wherein each core block is shaped as an 'L'.

17. The apparatus of claim 14, further comprising a coupling portion for coupling the first core block and the second core block at a contact between the first core block and the second core block.

18. The apparatus of claim 17, wherein the coupling portion couples outer side surfaces of the contact between the first core block and the second core block with an adhesive.

19. The apparatus of claim 14, wherein each frame and each core block are coupled by a weld at an interface therebetween.

20. The apparatus of claim 14, wherein the bobbin body is formed in a cylindrical shape, and has a space of which one side is open so as to wind the coil on an outer circumferential surface of the bobbin body.

21. A stator fixing apparatus of a reciprocating compressor, comprising:
a bobbin body formed in a cylindrical shape, and having a space of which one side is open so as to wind a coil on an outer circumferential surface of the bobbin body;
a first frame on which a plurality of first core blocks, each comprising a plurality of laminated stator core sheets, are radially coupled, the plurality of first core blocks being coupled to the first frame with an adhesive and coupled to one side surface of the bobbin body;
a second frame on which a plurality of second core blocks, each comprising a plurality of laminated stator core sheets, are radially coupled, the plurality of second core blocks being coupled to the second frame with an adhesive and coupled to another side surface of the bobbin body, and
a coupling member to couple the first frame to the second frame so that the first and second core blocks contact each other and contact said side surface and said another side surface of the bobbin body, wherein the plurality of first core blocks are coupled to the plurality of second core blocks with an adhesive, and the plurality of first core blocks and the plurality of second core blocks are arranged on the first and second frames so as to expose portions of the coil.

22. The apparatus of claim 21, wherein each core block comprises:
- a first portion coupled to an inner side surface of each frame that extends along the respective inner side surface of the frame; and
- a second portion integral with the first portion that extends perpendicular to the respective inner side surface of the frame.

23. The apparatus of claim 22, wherein each core block is shaped as an 'L'.

24. The apparatus of claim 21, wherein each frame and each core block are coupled by a weld at an interface therebetween.

25. The apparatus of claim 21, further comprising a coupling portion for coupling the first core block and the second core block at a contact between the first core block and the second core block.

26. The apparatus of claim 25, wherein the coupling portion couples outer side surfaces of the contact between the first core block and the second core block with an adhesive.

* * * * *